United States Patent
Tabuchi et al.

(10) Patent No.: US 8,173,054 B2
(45) Date of Patent: May 8, 2012

(54) SILICON CARBIDE BASED POROUS MATERIAL AND METHOD FOR PRODUCTION THEREOF

(75) Inventors: Yuuichirou Tabuchi, Nagoya (JP); Masahiro Furukawa, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 403 days.

(21) Appl. No.: 12/210,434

(22) Filed: Sep. 15, 2008

(65) Prior Publication Data

US 2009/0020902 A1 Jan. 22, 2009

Related U.S. Application Data

(62) Division of application No. 10/508,656, filed as application No. PCT/JP03/04086 on Mar. 31, 2003, now Pat. No. 7,452,591.

(30) Foreign Application Priority Data

Mar. 29, 2002 (JP) ................................ 2002-097260

(51) Int. Cl.
*C04B 33/32* (2006.01)
(52) U.S. Cl. ............ 264/43; 264/610; 264/630; 264/682
(58) Field of Classification Search .............. 264/42–44, 264/610, 630, 631, 682
See application file for complete search history.

(56) References Cited

U.S. PATENT DOCUMENTS

| | | | |
|---|---|---|---|
| 3,888,691 A * | 6/1975 | Villani et al. ................... 501/80 |
| 4,777,152 A * | 10/1988 | Tsukada ......................... 501/80 |
| 5,326,512 A | 7/1994 | Stillwagon et al. | |
| 6,180,559 B1 | 1/2001 | Roberts et al. | |
| 6,444,162 B1 * | 9/2002 | Anshits et al. ................ 264/628 |
| 6,582,796 B1 | 6/2003 | Joulin et al. | |
| 6,764,742 B2 | 7/2004 | Ichikawa et al. | |
| 6,773,481 B2 | 8/2004 | Noguchi et al. | |
| 6,815,038 B2 | 11/2004 | Morimoto et al. | |
| 7,011,803 B2 | 3/2006 | Ichikawa et al. | |
| 7,037,477 B2 | 5/2006 | Tomita et al. | |
| 7,244,685 B2 | 7/2007 | Furukawa et al. | |

(Continued)

FOREIGN PATENT DOCUMENTS

EP 0 322 998 7/1989

(Continued)

OTHER PUBLICATIONS

JP 06-116059 (Yamada) Apr. 26, 1994 (English machine translation of foreign patent already of record on applicant's IDS of Jan. 30, 2009). [online] [retrieved Apr. 21, 2009]. Retrieved from: Advanced Industrial Property Network, Japan Patent Office.*

*Primary Examiner* — Matthew Daniels
*Assistant Examiner* — Erin Snelting
(74) *Attorney, Agent, or Firm* — Burr & Brown (57) ABSTRACT

A silicon carbide-based porous material is provided, including silicon carbide particles as an aggregate, metallic silicon and an oxide phase containing Si, Al and an alkaline earth metal. The silicon carbide-based porous material is high in porosity and strength and superior in oxidation resistance and thermal shock resistance and, when used as a filter, has a very low risk of fluid leakage causing defects such as cuts and the like, as well as a low pressure loss.

5 Claims, 3 Drawing Sheets

U.S. PATENT DOCUMENTS

| | | |
|---|---|---|
| 2003/0053940 A1 | 3/2003 | Harada et al. |
| 2006/0121239 A1 | 6/2006 | Furukawa et al. |

FOREIGN PATENT DOCUMENTS

| | | |
|---|---|---|
| EP | 0 575 038 | 12/1993 |
| EP | 1 364 930 | 11/2003 |
| JP | 05-017227 A1 | 1/1993 |
| JP | 06-116059 A1 | 4/1994 |
| JP | 0 601 594 A1 | 6/1994 |
| JP | 06-182228 | 7/1994 |
| JP | 06-263464 A1 | 9/1994 |
| JP | 07-096165 A1 | 4/1995 |
| JP | 11-253722 | 9/1999 |
| JP | 2001-064084 A1 | 3/2001 |
| JP | 2001-146473 | 5/2001 |
| JP | 2001-206785 | 7/2001 |
| JP | 2002-050279 A1 | 2/2002 |
| JP | 2002-154882 | 5/2002 |
| JP | 2002-356384 | 12/2002 |
| WO | 01/53233 A1 | 7/2001 |

* cited by examiner

SILICON CARBIDE BASED POROUS MATERIAL AND METHOD FOR PRODUCTION THEREOF

CROSS REFERENCE TO RELATED APPLICATION

This application is a division of U.S. application Ser. No. 10/508,656, filed Sep. 22, 2004, now allowed, the entirety of which is incorporated herein by reference.

TECHNICAL FIELD

The present invention relates to a silicon carbide-based porous material suitable for use as a material constituting mainly a filter for purification of automobile exhaust gas, a catalyst carrier, or the like, as well as to a method for production thereof.

BACKGROUND ART

A Porous honeycomb structures constituted by cell partition walls (ribs) forming an assemblage of a plurality of cells adjacent to each other and a honeycomb outer wall surrounding and holding the outermost cells constituting the circumference of the assemblage of cells, are in wide use as filters (a diesel particulate filter, i.e. a DPF) for trapping and removing the particulate substance contained in a particle-containing fluid such as diesel engine exhaust gas or as catalyst carriers for carrying a catalyst component for purification of harmful substance in exhaust gas. Also, refractory silicon carbide (SiC) is in use as a material for the above porous honeycomb structure.

Development works are being pushed forward for a DPF (a DPF for catalyst regeneration) which comprises a conventional DPF and an oxidation catalyst carried thereon and which can oxidize and burn the particulates deposited on the catalyst to continuously regenerate the catalyst.

As such a honeycomb structure, there is disclosed, for example, a porous silicon carbide-based catalyst carrier of honeycomb type which is obtained by forming a silicon carbide powder (a raw material) having a desired specific surface area and containing impurities, into a formed material of intended shape, drying the formed material, and firing the dried formed material in a temperature range of 1,600 to 2,200° C. (e.g. Patent Literature 1).

In the case of the catalyst carrier disclosed in Patent Literature 1, in the sintering (necking) by the recrystallization reaction of the silicon carbide powder per se, the silicon carbide component vaporizes from the surface of the silicon carbide particles and condensates at the contact areas (necks) between the silicon carbide particles, whereby the necks grow and a bonded state results. However, the vaporization of silicon carbide requires a very high sintering temperature, which has invited a high cost; moreover, a material of high thermal expansion coefficient need be sintered at a high temperature, which has resulted in a low sintering yield. Further, when it is attempted to produce a filter of high porosity, particularly high porosity of 50% or more by the above-mentioned sintering by the recrystallization reaction of the silicon carbide powder per se, the sintering mechanism does not function sufficiently and the growth of necks is hindered and, as a result, the filter obtained has had a low strength.

Incidentally, in DPF, it is important to reduce, as much as possible, the pressure loss which has a large influence on the output of an engine. To achieve this task, it is required to allow the DPF to have a higher porosity, that is, to use, as the porous material constituting the DPF, a material of higher porosity.

Also, for DPF catalyst regeneration, it is required to suppress the pressure loss as much as possible, by using higher porosity, specifically, a porosity of 50% or more, particularly about 70%.

For obtaining a honeycomb structure having a higher porosity, there is a conventional method of adding a pore former such as starch, foamed resin or the like to a mixed raw material for a porous material (containing silicon carbide particles, etc.) constituting the honeycomb structure to be produced and, during firing of a formed material obtained, burning and blowing off the pore former. The amount of the pore former added need be large in order to achieve a porosity of certain level or higher, for example, a porosity of 60% or more; however, addition of a pore former of organic compound type in a large amount results in generation of a large amount of a gas (e.g. a volatile organic substance and carbon dioxide) during degreasing (calcination), as well as in generation of large combustion heat. The calcinated material (material after degreasing) or fired material obtained under such conditions has, in some cases, defects such as cracks, tears, cuts, large pores caused by agglomeration of organic pore former, and the like, that is, defects which do not allow proper functioning of filter and cause leakage of fluid.

Patent Literature 1: JP-A-6-182228

The present invention has been made in view of the above-mentioned problems of prior art and aims at providing a silicon carbide-based porous material which is high in porosity and strength and superior in oxidation resistance and thermal shock resistance and, when used as a filter, is very low in risk of having defects such as cuts (they cause leakage of fluid) and the like as well as in pressure loss; a honeycomb structure constituted thereby; and a method for producing a silicon carbide-based porous material having the above-mentioned properties.

SUMMARY OF THE INVENTION

According to the present invention, there is provided a silicon carbide-based porous material characterized by comprising silicon carbide particles as an aggregate, metallic silicon and an oxide phase containing Si, Al and an alkaline earth metal.

In the present invention, it is preferred that the oxide phase is on surfaces of and/or at circumferences of the silicon carbide particles and/or the metallic silicon.

In the present invention, it is preferred that the oxide phase contains $SiO_2$, $Al_2O$ and an alkaline earth metal and the content of the alkaline earth metal relative to the oxide phase total is 9 to 50% by mass in terms of the content of a monoxide of the alkaline earth metal.

In the present invention, it is preferred that the alkaline earth metal is at least one kind selected from the group consisting of Mg, Ca, Sr and Ba.

In the present invention, it is preferred that the silicon carbide-based porous material has a porosity of 50 to 80% and an average pore diameter of 10 to 50 µm; and it is also preferred that, when the average pore diameter is expressed as $10^x$ µm and the distribution of the pore diameters is expressed on volume basis, the total volume of pores (particular pores) whose diameters are in a range of $10^{x\pm0.25}$ µm, is 80% or more of the volume of total pores.

In the present invention, it is preferred that the oxide phase covers at least part of the surfaces of the silicon carbide particles and/or the metallic silicon.

In the present invention, it is preferred that at least part of the oxide phase is constituted by at least one kind selected from the group consisting of cordierite, anorthite, Sr feldspar ($SrAl_2Si_2O_8$) and celsian ($BaAl_2Si_2O_8$).

According to the present invention, there is also provided a honeycomb structure characterized by being constituted by any of the above-mentioned silicon carbide-based porous materials.

According to the present invention, there is also provided a method for producing a silicon carbide-based porous material, characterized in that it comprises adding, to a mixed raw material containing silicon carbide particles and metallic silicon, inorganic microballoons containing Si and Al and a compound containing an alkaline earth metal, forming the resulting mixture into a formed material of intended shape, and calcinating and firing the formed material to melt the inorganic microballoons to obtain a porous material of porous structure wherein an oxide phase containing Si, Al and an alkaline earth metal is on surfaces of and/or at circumferences of the silicon carbide particles and/or the metallic silicon.

In the present invention, it is preferred that the alkaline earth metal in the compound containing an alkaline earth metal is at least one selected from the group consisting of Mg, Ca, Sr and Ba.

In the present invention, it is preferred that the compound containing an alkaline earth metal is a compound which, when subjected to oxidation or decomposition, becomes at least one kind of alkaline earth metal monoxide selected from the group consisting of MgO, CaO, SrO and BaO.

In the present invention, it is preferred that the inorganic microballoons are added in an amount of 5 to 30 parts by mass per 100 parts by mass of the total of the silicon carbide particles and the metallic silicon.

In the present invention, it is preferred that the compound containing an alkaline earth metal is added, per 100 parts by mass of the inorganic microballoons added, by 10 to 100 parts by mass in terms of the amount of a monoxide of the alkaline earth metal including the alkaline earth metal contained beforehand in the microballoons. It is further preferred that the compound containing an alkaline earth metal is added, per 100 parts by mass of the inorganic microballoons added, by 10 to 25 parts by mass in terms of the amount of MgO when the alkaline earth metal contained in the compound containing an alkaline earth metal is Mg, by 14 to 35 parts by mass in terms of the amount of CaO when the alkaline earth metal is Ca, by 26 to 64 parts by mass in terms of the amount of SrO when the alkaline earth metal is Sr, or by 38 to 95 parts by mass in terms of the amount of BaO when the alkaline earth metal is Ba.

In the present invention, it is preferred that the total content of the Si source and Al source contained in the inorganic microballoons, relative to the inorganic microballoons residual portion which is the inorganic microballoons total portion minus the alkaline earth metal (expressed as a monoxide thereof) contained beforehand in the total portion, is 90% by mass or more when the Si source is expressed as $SiO_2$ and the Al source is expressed as $Al_2O_3$, and the content of the Al source contained in the inorganic microballoons, relative to the inorganic microballoons residual portion which is the inorganic microballoons total portion minus the alkaline earth metal (expressed as a monoxide thereof) contained beforehand in the total portion, is 20 to 55% by mass when the Al source is expressed as $Al_2O_3$.

In the present invention, it is preferred that the intended shape of the formed material is a honeycomb shape.

DETAILED DESCRIPTION OF THE INVENTION

The best mode for carrying out the present invention is described below. However, the present invention is not restricted to the following mode and it should be construed that design changes, improvements, etc. can be made appropriately based on the ordinary knowledge possessed by those skilled in the art without deviating from the scope of the present invention.

The silicon carbide-based porous material of the present invention is characterized by comprising silicon carbide particles as an aggregate, metallic silicon and an oxide phase containing Si, Al and an alkaline earth metal. It is described in detail below.

The silicon carbide-based porous material of the present invention comprises silicon carbide particles as an aggregate and metallic silicon. Therefore, in its production, firing can be conducted at a relatively low temperature; the production cost is low; and an improvement in product yield is obtained. Further, the present porous material shows a high thermal conductivity because metallic silicon is used for bonding of silicon carbide particles which are refractory particles; and, when it is used, for example, as a DPF and when the particulates deposited on the filter are burnt for filter regeneration, there hardly occurs such local temperature rise as to damage the filter.

Further, it comprises an oxide phase containing Si, Al and an alkaline earth metal; therefore, even when it is exposed to a low-oxygen atmosphere and a high temperature (both experienced when it is used as a DPF), oxidation and decomposition of silicon carbide and metallic silicon are suppressed. Thus, the silicon carbide-based porous material of the present invention is superior in oxidation resistance and thermal shock resistance and shows an effect that there is hardly the damage of filter caused by the heat generation due to, for example, the oxidation of silicon carbide and metallic silicon taking place during filter regeneration. It is preferred that the oxide phase is on surfaces of or at circumferences of the silicon carbide particles and/or the metallic silicon because a higher effect is expected. In the present invention, it is more preferred in order to obtain improved oxidation resistance and thermal shock resistance that the oxide phase covers at least part of the surfaces of the silicon carbide particles and/or the metallic silicon. It is particularly preferred in order to obtain an improved strength that the oxide phase is filled in the pores of 10 µm or less to complement the necking between silicon carbide particles.

It is further preferred that the oxide phase contains $SiO_2$, $Al_2O_3$ and an alkaline earth metal and that the content of the alkaline earth metal, specifically at least one kind selected from the group consisting of Mg, Ca, Sr and Ba, relative to the oxide phase total is 9 to 50% by mass in terms of the content of a monoxide of the alkaline earth metal.

When the content of the alkaline earth metal relative to the oxide phase total is less than 9% by mass in terms of the content of a monoxide of the alkaline earth metal, a higher firing temperature is needed and, therefore, such a content is not preferred. When the content is more than 50% by mass, the oxide phase has a too low a eutectic point, the fired material shrinks, and the porosity thereof decreases; therefore, such a content is not preferred. In order to form, by conducting firing under given conditions, an oxide phase (feldspar) effective for higher thermal shock resistance, oxidation resistance and strength, such as cordierite, anorthite, Sr feldspar ($SrAl_2Si_2O_8$) or celsian ($BaAl_2Si_2O_8$), the content of the alkaline earth metal relative to the oxide phase total is particularly preferred to be 9 to 20% by mass as MgO, 12 to 26% by mass as CaO, 20 to 39% by mass as SrO or 28 to 49% by mass as BaO, according to the formula weights of the individual feldspars. Incidentally, specific conditions, etc. of firing are described later.

In the present invention, "the content of the alkaline earth metal relative to the oxide phase total" refers to a value obtained by conducting EDS to an oxide phase (containing an alkaline earth metal) present in the polished surface of a silicon carbide-based porous material and measuring the resulting characteristic X-ray of the alkaline earth metal, or a value obtained by determining the C, O, Si, Al and alkaline earth metal (Mg, Ca, Sr or Ba) of a silicon carbide-based porous material using an elemental analysis apparatus (e.g. Simultaneous X-ray Spectrometer System) and then subtracting therefrom the portions belonging to the silicon carbide particles and the metallic silicon to obtain the remainder as the content inside the oxide phase. For example, there is calculated the amount of oxygen when the amount of Al obtained is expressed as the amount of $Al_2O_3$ and the amount of alkaline earth metal obtained is expressed as the amount of its monoxide; this oxygen amount is subtracted from the total oxygen amount obtained; the remaining oxygen amount can be taken as the amount of $SiO_2$. Incidentally, the cordierite, anorthite, Sr feldspar ($SrAl_2Si_2O_8$) or celsian ($BaAl_2Si_2O_8$) constituting the oxide phase can be confirmed by measurement of powder X-ray diffraction pattern and identification. Examples of the measurement method, etc. have been shown above; however, the measurement method for the content of alkaline earth metal relative to oxide phase total and the method for identification of cordierite, anorthite, Sr feldspar ($SrAl_2Si_2O_8$) or celsian ($BaAl_2Si_2O_8$) are not restricted to the above measurement and identification methods.

The silicon carbide-based porous material of the present invention is preferred to have a porosity of 50 to 80% and further an average pore diameter of 10 to 50 µm. A porosity of less than 50% or an average pore diameter of less than 10 µm is not preferred because, when such a silicon carbide-based porous material is used in a DPF, particularly, a DPF for catalyst regeneration (wherein a catalyst component is coated inside the pores at a later stage) or the like, the silicon carbide-based porous material is unable to effectively carry the catalyst component thereon. A porosity of more than 80% or an average pore diameter of more than 50 µm is not preferred because it results in a very low strength and gives a DPF, a DPF for catalyst regeneration, or the like, of insufficient durability. For a high porosity, a low pressure loss and a high strength, the silicon carbide-based porous material of the present invention is more preferred to have a porosity of 50 to 75% and an average pore diameter of 20 to 50 µm and is particularly preferred to have a porosity of 55 to 70% and an average pore diameter of 25 to 50 µm.

In the silicon carbide-based porous material of the present invention, in order to make low the leakage caused by large pores and effectively low the pressure loss, it is preferred that, when the average pore diameter is expressed as $10^x$ µm and the distribution of the pore diameters is expressed on volume basis, the total volume of pores (particular pores) whose diameters are in a range of $10^{x \pm 0.25}$ µm, is 80% or more of the volume of total pores. A total volume of particular pores, of 80% or less of the volume of total pores is not preferred because the number of pores having diameters much smaller or much larger than the average pore diameter is large, small pores are unable to exhibit effective reduction in pressure loss, and large pores causes leakage of fluid and effective trapping of particulates, etc. is not made. Incidentally, the average pore diameter ($10^x$ µm) as a base point is appropriately selected in a DPF, particularly, a DPF for catalyst regeneration (wherein a catalyst component is coated inside the pores at a later stage) or the like, depending upon the use conditions, the kind and amount of catalyst component carried, etc.

The honeycomb structure according to the present invention is characterized by being constituted by any of the above-mentioned silicon carbide-based porous materials. This honeycomb structure is superior in oxidation resistance, acid resistance, resistance to reactivity with particulates and thermal shock resistance, reflecting the properties of the silicon carbide-based porous material which constitutes the honeycomb structure. Further, the present honeycomb structure can be used as a DPF, a DPF for catalyst regeneration, a catalyst carrier or the like, under high SV (space velocity) conditions.

Description is made next on the method for producing the silicon carbide-based porous material of the present invention. In producing the silicon carbide-based porous material of the present invention, first, there is prepared a mixed raw material containing silicon carbide particles and metallic silicon. Incidentally, the silicon carbide particles and the metallic silicon contain, in some cases, a very small amount of impurities such as Fe, Al, Ca and the like; however, they may be used per se or after purification by chemical treatment such as reagent washing. To the prepared mixed raw material are added inorganic microballoons containing Si and Al and a compound containing an alkaline earth metal. Then, a forming aid such as organic binder or the like is added as necessary, followed by mixing and kneading to obtain a clay for forming.

The inorganic microballoons function as a pore former when added to the mixed raw material. As compared with conventional organic pore formers such as starch, foamed resin and the like, the inorganic microballoons have a low specific gravity and an appropriate strength; therefore, they hardly crumble during mixing and kneading and are easy to handle. The pore former used may be totally the inorganic microballoons, or the inorganic microballoons may be used in combination with an organic pore former. The clay obtained is formed into a formed material of intended shape such as honeycomb shape or the like; the formed material is calcinated to remove the organic binder contained therein (degreasing) and then fired; thereby, a silicon carbide-based porous material can be obtained.

In the present invention, a compound containing an alkaline earth metal is added simultaneously to the mixed raw material. The compound containing an alkaline earth metal refers to such a compound that the alkaline earth metal contained therein is at least one kind selected from the group consisting of Mg, Ca, Sr and Ba, and specifically is a compound such as strontium carbonate ($SrCO_3$), calcium acetate ($Ca(CH_3COO)_2$) or the like, which, in calcination or firing, is oxidized or decomposed to become at least one kind of alkaline earth metal monoxide selected from the group consisting of MgO, CaO, SrO and BaO. By adding this compound, the inorganic microballoons melt in firing and form a porous structure of high porosity and also form an oxide phase containing Si, Al and an alkaline earth metal, on surfaces of and/or at circumferences of the silicon carbide-based particles and/or the metallic silicon. This oxide phase is formed in an appropriate amount on surfaces of and/or at circumferences of the silicon carbide-based particles and/or the metallic silicon; as a result, the resulting silicon carbide-based porous material is improved in strength, oxidation resistance and thermal shock resistance.

The inorganic microballoons retain its shape after calcination. They generate no gaseous component when fired. Therefore, the resulting silicon carbide-based porous material hardly has defects such as crack, tear, cut and the like. They exhibit the same effects as mentioned above even when used in combination with an organic pore former. In the present invention, it is preferred that the total content of the Si source and Al source contained in the inorganic microballoons added, relative to the inorganic microballoons residual portion which is the inorganic microballoons total portion minus the alkaline earth metal (expressed as a monoxide thereof) contained beforehand in the total portion, is 90% by mass or more when the Si source is expressed as $SiO_2$ and the Al source is expressed as $Al_2O_3$ and that the content of the Al source contained in the inorganic microballoons, relative to the inorganic microballoons residual portion which is the inorganic microballoons total portion minus the alkaline earth metal (expressed as a monoxide thereof) contained beforehand in the total portion, is 20 to 55% by mass when the Al source is expressed as $Al_2O_3$, because such inorganic microballoons have a lower eutectic point and can melt at lower temperatures. Preferred examples of such inorganic microballoons include fly ash balloons (coal ash) which are generated as a waste in thermal power plants, etc., because effective utilization of waste is made possible.

When the total content of the Si source and Al source contained in the inorganic microballoons added, relative to the inorganic microballoons residual portion which is the inorganic microballoons total portion minus the alkaline earth metal (expressed as a monoxide thereof) contained beforehand in the total portion, is less than 90% by mass when the Si source is expressed as $SiO_2$ and the Al source is expressed as $Al_2O_3$, the inorganic microballoons have too low a eutectic point, the fired material shrinks, and no sufficient pore forming takes place. A total content of less than 90% by mass is not preferred, either, because there is hardly formed an oxide phase such as cordierite, anorthite, Sr feldspar ($SrAl_2Si_2O_8$) or celsian ($BaAl_2Si_2O_8$), which is effective for improvements in thermal shock resistance, oxidation resistance and strength. There is no particular restriction as to the upper limit of the total content and a higher content is preferred theoretically. When the content of the Al source contained in the inorganic microballoons, relative to the inorganic microballoons residual portion which is the inorganic microballoons total portion minus the alkaline earth metal (expressed as monoxide thereof) contained beforehand in the total portion, is less than 20% by mass when the Al source is expressed as $Al_2O_3$, the $SiO_2$ in the inorganic microballoons is excessive and the inorganic microballoons are not melted; therefore, such an Al source content is not preferred. An Al source content of more than 55% by mass is not preferred, either, because the $SiO_2$ is short and the inorganic microballoons are not melted. The content of the Al source is preferably 25 to 50% by mass, particularly preferably 30 to 45% by mass in order to form an oxide phase which is effective for improvements in thermal shock resistance, oxidation resistance and strength.

In the present invention, "the total content of the Si source and Al source contained in the inorganic microballoons when the Si source is expressed as $SiO_2$ and the Al source is expressed as $Al_2O_3$" is a value determined by Agglomerated mass plus absorptiometry and the EDTA titration method conducted based on JIS M 8853 (methods for chemical analysis of refractory clay). Also, "the content of the Al source contained in the inorganic microballoons when the Al source is expressed as $Al_2O_3$" is a value determined by the above methods.

The porosity and average pore diameter of the silicon carbide-based porous material can be controlled by appropriately adjusting the size, addition amount, etc. of the inorganic microballoons. Incidentally, depending upon parameters such as the composition of the inorganic microballoons and the kind and addition amount of the compound containing an alkaline earth metal, there vary the melting temperature of the inorganic microballoons and the oxide phase formed. Therefore, from these parameters, there can be known beforehand the firing temperature and the oxide phase of the silicon carbide-based porous material obtained, and the material design and production design of the porous material can be made flexibly depending upon the use conditions of the DPF of the like produced from the porous material.

In the present invention, the inorganic microballoons are preferred to have a mean particle diameter of 100 μm or less because it enables extrusion of a honeycomb having a partition wall thickness of 300 μm or less. This mean particle diameter is a value obtained by measurement using a particle size distribution tester of laser scattering type. The inorganic microballoons are also preferred to have a compression strength of 1 MPa or more as calculated with an assumption that each inorganic microballoon is a solid sphere, because, at such a compression strength, crumbling takes place hardly during kneading. This compression strength is a value obtained by measurement using a minute compression tester. The inorganic microballoons are also preferred to have a tap packing density of 0.4 g/cm$^3$ or less and a shell thickness of 10 μm or less, particularly 5 μm or less. The shell thickness is a value obtained by observation of the broken surface or polished surface using a microscope. As a specific example of the inorganic microballoons satisfying these conditions, there can be mentioned E-SPHERES SL-75 (a product of ENVIROSPHERES Co.); however, the inorganic microballoons usable in the present invention are not restricted to such a specific example.

In the present invention, the inorganic microballoons are added in an amount of preferably 5 to 30 parts by mass, more preferably 10 to 30 parts by mass per 100 parts by mass of the total of the silicon carbide particles and the metallic silicon. When the amount of the inorganic microballoons added is less than 5 parts by mass, no pore forming effect is exhibited; when the amount is more than 30 parts by mass, the amount of the oxide phase formed is too large and, resultantly, the fired material shrinks and there is substantially no pore forming effect; therefore, such amounts are not preferred. Incidentally, when a higher porosity is desired, the inorganic microballoons may be used in combination with an organic pore former.

In the present invention, it is preferred that the compound containing an alkaline earth metal is added, per 100 parts by mass of the inorganic microballoons added, by 10 to 100 parts by mass in terms of the amount of a monoxide of the alkaline earth metal including the alkaline earth metal contained beforehand in the microballoons. In order to form, in particular, an oxide phase (feldspar) effective for improvement of thermal shock resistance, oxidation resistance and strength, such as cordierite, anorthite, Sr feldspar ($SrAl_2Si_2O_8$) or celsian ($BaAl_2Si_2O_8$), the compound containing an alkaline earth metal is added, per 100 parts by mass of the inorganic microballoons added, by 10 to 25 parts by mass in terms of the amount of MgO when the alkaline earth metal contained in the compound containing an alkaline earth metal is Mg, by 14 to 35 parts by mass in terms of the amount of CaO when the alkaline earth metal is Ca, by 26 to 64 parts by mass in terms of the amount of SrO when the alkaline earth metal is Sr, and by 38 to 95 parts by mass in terms of the amount of BaO when the alkaline earth metal is Ba. When the addition amount of the compound containing an alkaline earth metal is less than 10 parts by mass in terms of the amount of a monoxide of the alkaline earth metal, the inorganic microballoons are difficult to melt; when the addition amount is more than 100 parts by mass, excessive inorganic microballoons remain as such, the fired material shrinks, and no sufficient pore forming effect is obtained; therefore, such amounts are not preferred.

Incidentally, in the present invention, the compound containing an alkaline earth metal may contain only one kind of alkaline earth metal or two or more kinds of alkaline earth metals. Only one kind of compound containing alkaline earth metal may be added, or two or more kinds of compounds may be added. When two or more kinds of compounds are added, the addition amounts of the individual compounds may be different from each other or may be equal to each other. By allowing both the compound containing an alkaline earth metal and the inorganic microballoons to be present in the clay prepared, followed by firing, it is possible to melt the inorganic microballoons to form a porous structure of high porosity and also an oxide phase. Further, by using inorganic microballoons which are not burned off (not removed) when fired, the risk of formation of large pores is kept very low even if there arises agglomeration of the pore former (this becomes a problem with an organic pore former, etc.); consequently, the risk of fluid leakage is very low and the particulates, etc. contained in a particle-containing fluid can be trapped efficiently. Further, since the molten oxide phase fills minute pores, the necking between silicon carbide particles is complemented, achieving an increased strength. Furthermore, by forming, in the oxide phase, cordierite, anorthite, Sr feldspar ($SrAl_2Si_2O_8$), celsian ($BaAl_2Si_2O_8$) or the like, there can be obtained increases in thermal shock resistance, oxidation resistance and strength. Incidentally, as the compound containing an alkaline earth metal, there is preferably used a monoxide, carbonate or the like of an alkaline earth metal from the standpoints of efficient formation of oxide phase, availability, handleability, etc.

In the present invention, calcination is conducted preferably at a temperature lower than the temperature at which the metallic silicon melts. Specifically explaining, calcination may be conducted at a given temperature of about 150 to 700° C., or in a given temperature range at a small temperature elevation rate of 50° C./hr or less. When calcination is conducted at a given temperature, the given temperature may be one temperature level or a plurality of temperature levels depending upon the kind and amount of the organic binder used; and when a plurality of temperature levels are adopted, the time lengths of the individual temperature levels may be the same or different. When calcination is conducted at a small temperature elevation rate, the small temperature elevation rate may be adopted only in one temperature range or a plurality of temperature ranges; and when the small temperature elevation rate is adopted in a plurality of temperature ranges, the temperature elevation rates in the individual temperature ranges may be the same or different.

In order to allow the silicon carbide-based porous material obtained to have a porous structure wherein the refractory particles contained therein are bonded by metallic silicon, the metallic silicon need be melted during firing. Since the melting point of metallic silicon is 1,410° C., the firing temperature is preferably 1,410° C. or more. The most appropriate firing temperature is determined from the micro-structure and properties of the silicon carbide-based porous material finally obtained. At a temperature higher than 1,600° C., metallic silicon vaporizes, making bonding via metallic silicon difficult; therefore, the firing temperature is appropriately 1,410 to 1,600° C., preferably 1,420 to 1,580° C.

The present invention is described more specifically below by way of Examples. However, the present invention is in no way restricted to these Examples.

Examples 1 to 5 and 7 to 10

A SiC raw material powder having an average particle diameter of 47 μm and a Si powder having an average particle diameter of 5 μm were compounded so as to give a composition of 80:20 in mass ratio. To 100 parts by mass of the resulting powder were added fly ash balloons having mass parts shown in Table 1, and there was (were) also added an alkaline earth metal monoxide(s) having mass parts shown in Table 1, relative to 100 parts by mass of the fly ash balloons. Then, there were added 6 parts by mass of methyl cellulose as an organic binder, 2.5 parts by mass of a surfactant and 24 parts by mass of water, followed by uniform mixing and kneading to obtain various clays for forming. Each clay was formed by an extruder into a formed material of honeycomb shape having an outer diameter of 45 mm, a length of 120 mm, a partition wall thickness of 0.43 mm and a cell density of 100 cells/in.$^2$ (16 cells/cm$^2$). Then, the formed material was calcinated for degreasing at 500° C. for 5 hours and thereafter fired in an non-oxidizing atmosphere at 1,450° C. for 2 hours to produce various silicon carbide-based porous materials of honeycomb structure, of Examples 1 to 5 and 7 to 10. Incidentally, the electron micrographs showing the microstructures of the silicon carbide-based porous materials of Examples 1 to 3 and 9 are shown in FIGS. 1 to 4, respectively. Further, the oxide phase of each porous material was identified by X-ray diffraction. The results are shown in Table 1.

Example 6

A silicon carbide-based porous material of honeycomb structure of Example 6 was produced by the same operation as in Examples 1 to 5 and 7 to 10 except that a starch having an average particle diameter of 50 μm was added as an organic pore former. Further, the oxide phase of the porous material was identified by X-ray diffraction. The results are shown in Table 1.

Examples 11 to 13

Silicon carbide-based porous materials of honeycomb structure were produced by the same operation as in Examples 1 to 5 and 7 to 10 except that the fly ash balloons were replaced by inorganic microballoons different in the content of total of $Al_2O_3$ and $SiO_2$ (Example 11) or by inorganic microballoons different in the content of $Al_2O_3$ (Examples 12 and 13).

Comparative Example 1

Figure 5:
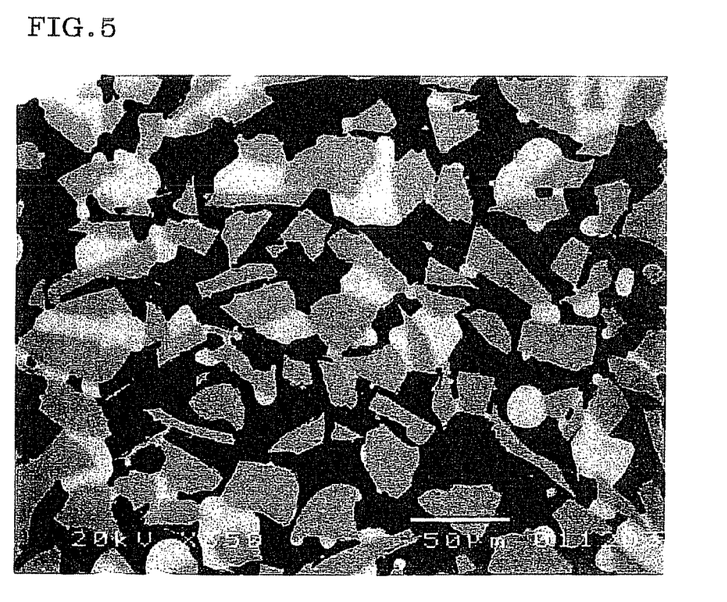
FIG. 5 is an electron micrograph showing the micro-structure of the silicon carbide-based porous material of Comparative Example 1.

A silicon carbide-based porous material of honeycomb structure of Comparative Example 1 was produced by the same operation as in Examples 1 to 5 and 7 to 10 except that there was used neither fly ash balloons nor alkaline earth metal oxide. The electron micrograph showing the microstructure of the silicon carbide-based porous material of Comparative Example 1 is shown in FIG. 5. Further, the oxide phase of the porous material was identified by X-ray diffraction. The results are shown in Table 1.

Comparative Examples 2 to 3

A silicon carbide-based porous materials of honeycomb structure of Comparative Example 2 was produced by the same operation as in Example 6 except that there was used neither fly ash balloons nor alkaline earth metal oxide. Further, the oxide phase of the porous material was identified by X-ray diffraction. The results are shown in Table 1.

(Evaluation of Physical Properties)

Each of the silicon carbide-based porous materials produced was measured for the following physical properties. The results are shown in Table 1.

[Porosity]

Measured by the Archimedes method.

[Average Pore Diameter]

Measured using a mercury porosimeter.

[Control of Pore Diameters]

When the average pore diameter measured by the above mercury porosimeter was expressed as $10^x$ µm and the distribution of the pore diameters was expressed on volume basis, the ratio of the total volume of pores (particular pores) whose diameters were in a range of $10^{x \pm 0.25}$ µm, relative to the volume of total pores was calculated and taken as control (%) of pore diameters.

[Mass Increase in Oxidation Resistance Test]

An oxidation resistance test was conducted by a heat treatment in the air at 800° C. for 24 hours. The masses of each silicon carbide-based porous material before and after the test were measured and the mass increase thereof was calculated according to the following expression (1).

Mass increase (%)=[(mass after test)−(mass before test)]/(mass before test)×100    (1)

[Strength]

Four-point bending strength at room temperature was measured according to the method specified by JIS R 1601.

[Permeability]

Measured using Permporometer (a product of PMI Co.). Incidentally, "permeability" is a value indicating the flowability of a fluid per unit area of filter material.

[Trapping Efficiency]

There was used an engine capable of generating a given amount of particulates per unit time. A filter paper was provided at the outlet of the engine; the mass of particulates deposited on the filter paper when no filter (silicon carbide-based porous material) was fitted, was taken as 100; therefrom was subtracted the mass of particulates deposited on the filter paper when a filter (silicon carbide-based porous material) was fitted; the remainder obtained was taken as "trapping efficiency (%)".

TABLE 1

| | | Fly ash balloons | Amount of organic | Alkaline earth metal monoxide | | | | Av. pore | Control of pore | Mass increase in oxidation | 4-point bending | Perme- ability | Trap- ping |
|---|---|---|---|---|---|---|---|---|---|---|---|---|---|
| | Si/SiC (mass ratio) | Amount (mass parts) | $Al_2O_3$ + $SiO_2$ (%) [$Al_2O_3$ alone] | pore former (mass parts) | Kind | Amount (mass parts) | Oxide phase | Porosity (%) | diameter (µm) | diameters (%) | resistance test (%) | strength (MPa) | ($\times 10^{-12}$ m²) | efficiency (%) |
| Ex. 1 | 20/80 | 10 | 98 [35] | Not used | CaO | 22 | Anorthite | 53 | 25 | 92 | 0 | 22 | 5.9 | 93 |
| Ex. 2 | 20/80 | 10 | 98 [35] | Not used | MgO | 17 | Cordierite | 52 | 24 | 90 | 0 | 24 | 5.3 | 96 |
| Ex. 3 | 20/80 | 20 | 98 [35] | Not used | SrO | 50 | $SrAl_2Si_2O_8$ | 50 | 30 | 91 | 0 | 30 | 7.8 | 91 |
| Ex. 4 | 20/80 | 10 | 98 [35] | Not used | CaO | 40 | Calcium silicate | 51 | 25 | 90 | 0.3 | 17 | — | — |
| Ex. 5 | 20/80 | 10 | 98 [35] | Not used | MgO | 33 | Forsterite + spinel | 53 | 25 | 89 | 0.3 | 19 | — | — |
| Ex. 6 | 20/80 | 20 | 98 [35] | 10 | SrO, CaO | 30 (SrO), 9 (CaO) | $SrAl_2Si_2O_8$ + anorthite | 64 | 31 | 85 | 0 | 15 | 18 | 89 |
| Ex. 7 | 20/80 | 3 | 98 [35] | Not used | CaO | 22 | Anorthite | 47 | 15 | — | — | — | — | — |
| Ex. 8 | 20/80 | 40 | 98 [35] | Not used | CaO | 22 | Anorthite | 49 | 20 | — | — | — | — | — |
| Ex. 9 | 20/80 | 10 | 98 [35] | Not used | CaO | 9 | Mullite | 53 | 9 | — | — | — | — | — |
| Ex. 10 | 20/80 | 10 | 98 [35] | Not used | SrO | 105 | Strontium silicate + strontium oxide | 48 | 20 | — | — | — | — | — |
| Ex. 11 | 20/80 | 10 | 89 [35] | Not used | CaO | 22 | — | 46 | 21 | — | — | — | — | — |
| Ex. 12 | 20/80 | 10 | 98 [15] | Not used | CaO | 22 | — | 53 | 9 | — | — | — | — | — |

TABLE 1-continued

| | | Fly ash balloons | | Amount of organic pore former (mass parts) | Alkaline earth metal monoxide | | | | Av. pore diameter (μm) | Control of pore diameters (%) | Mass increase in oxidation resistance test (%) | 4-point bending strength (MPa) | Permeability (×10⁻¹² m²) | Trapping efficiency (%) |
|---|---|---|---|---|---|---|---|---|---|---|---|---|---|---|
| | Si/SiC (mass ratio) | Amount (mass parts) | Al₂O₃ + SiO₂ (%) [Al₂O₃ alone] | | Kind | Amount (mass parts) | Oxide phase | Porosity (%) | | | | | | |
| Ex. 13 | 20/80 | 10 | 98 [65] | Not used | CaO | 22 | — | 53 | 9 | — | — | — | — | — |
| Comp. Ex. 1 | 20/80 | Not used | — | Not used | Not used | Not used | Not used | 44 | 12 | — | 1.3 | 10 | 0.4 | — |
| Comp. Ex. 2 | 20/80 | Not used | — | 30 | Not used | Not used | Not used | 62 | 20 | 68 | — | 5.2 | 4.3 | 72 |
| Comp. Ex. 3 | 20/80 | Not used | — | 60 | Not used | Not used | Not used | 82 | 53 | — | — | 1.1 | — | — |

When fly ash balloons and a compound containing an alkaline earth metal are appropriately added to a mixed raw material, followed by firing and melting (Examples 1 to 5), it was found that the resulting silicon carbide-based porous material can have a higher porosity and a larger average pore diameter and, when the average pore diameter of the porous material is expressed as $10^x$ μm and the distribution of the pore diameters of the porous material is expressed on volume basis, the diameters of the pores occupying 80% or more of the volume of total pores can be controlled in a range of $10^{x\pm0.25}$ μm. It was found that as a consequence, the pressure loss of the porous material is significantly reduced (the permeability is increased significantly) and its efficiency for trapping particulates is increased. It was also found that the oxide phase generated by melting of fly ash balloons gives a higher strength and a higher oxidation resistance. In contrast, in the conventional method, since the porosity and pore diameters of porous material are small, the permeability is low and, when the porous material is used as a filter, a large pressure loss arises (Comparative Example 1).

With respect to the addition amount of the fly ash balloons, it was found that, when the addition amount is too small (Example 7), no pore forming effect appears and a porosity of 50% or less is obtained and, when the addition amount is too large (Example 8), the amount of the oxide phase formed is too large and, therefore, the fired material obtained shrinks and no sufficient pore forming effect is obtained.

With respect to the addition amount of the oxide, it was found that, when the addition amount is too small (Example 9), there is no melting of fly ash balloons, resulting in a small average pore diameter and, when the addition amount is too large (Example 10), an excessive portion of the oxide remains, the fired material obtained shrinks, and no sufficient pore forming effect is obtained. Further, by controlling, at an appropriate level, the addition amount of the oxide relative to the addition amount of the fly ash balloons, it was found that anorthite, cordierite or Sr feldspar ($SrAl_2Si_2O_8$) is formed as an oxide phase and a higher oxidation resistance and a higher strength are obtained (comparison of Examples 1 to 3 with Examples 4 and 5).

With respect to the content of Al source and Si source in fly ash balloons, it was found that, when the total content of the $Al_2O_3$ and $SiO_2$ contained in the fly ash balloons relative to the fly ash balloons residual portion which is the fly ash balloons total portion minus the alkaline earth metal contained beforehand in the total portion, is less than 90% (Example 11), too low an eutectic point results, the fired material obtained shrinks, and no sufficient pore forming effect is obtained. It was also found that, even when the above total content is 90% or more but when the content of $Al_2O_3$ is too small (Example 12), $SiO_2$ becomes excessive and there is no melting of the fly ash balloons and, when the content of $Al_2O_3$ is too large (Example 13), $SiO_2$ becomes insufficient and there is no melting of the fly ash balloons, either in this case.

Figure 1:
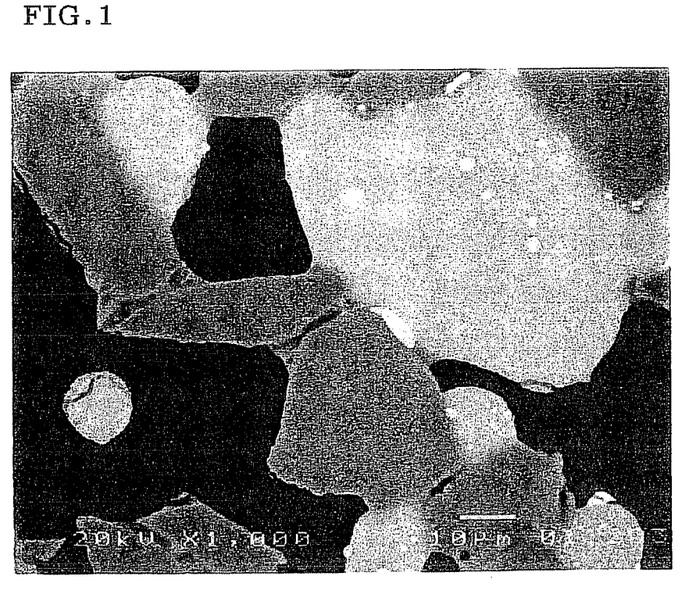
FIG. 1 is an electron micrograph showing the micro-structure of the silicon carbide-based porous material of Example 1.
Figure 2:
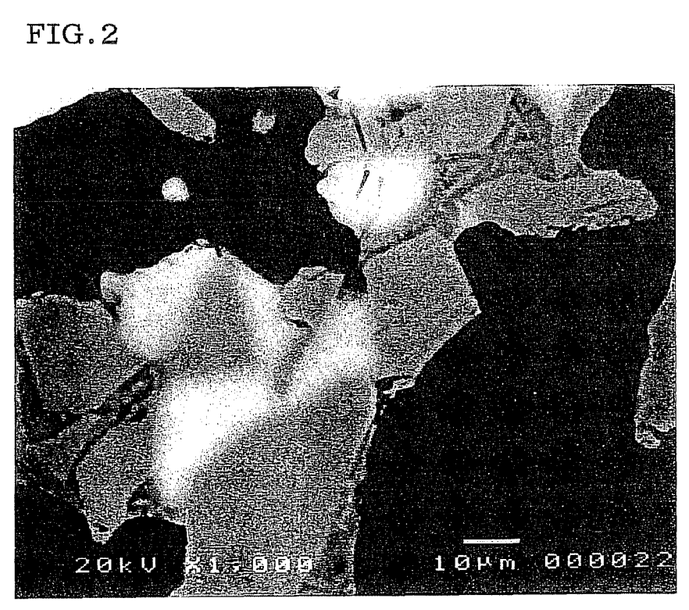
FIG. 2 is an electron micrograph showing the micro-structure of the silicon carbide-based porous material of Example 2.
Figure 3:
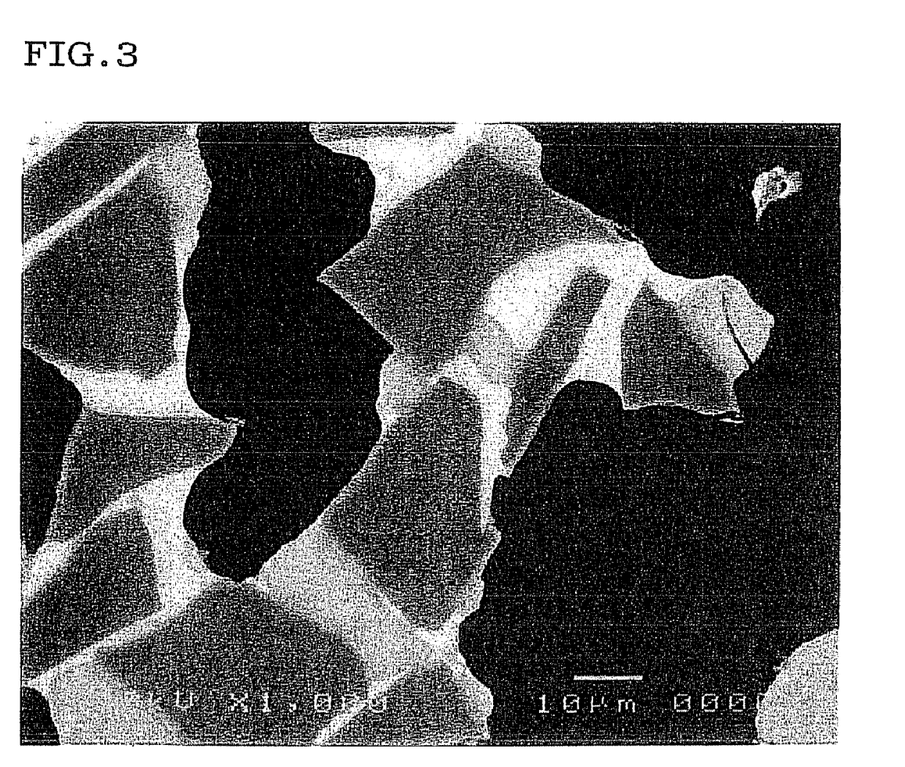
FIG. 3 is an electron micrograph showing the micro-structure of the silicon carbide-based porous material of Example 3.
Figure 4:
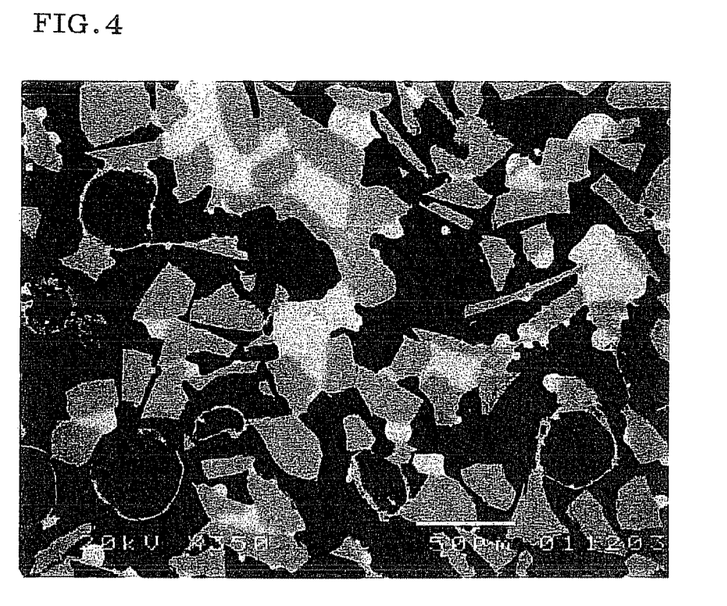
FIG. 4 is an electron micrograph showing the micro-structure of the silicon carbide-based porous material of Example 9.

In FIG. 1 (Example 1) and FIG. 2 (Example 2), the black portions are pores, the gray portions are silicon carbide particles, the light gray portions are metallic silicon, and the dark gray (darker than silicon carbide particles) portions which are present on surfaces of and/or at circumferences of the silicon carbide particles and/or the metallic silicon, are an oxide phase. Meanwhile, in FIG. 3, there is no difference from FIGS. 1 and 2 with respect to the pores (black portions), the silicon carbide particles (gray portions) and the metallic silicon (light gray portions), but the oxide phase is white because it contains Sr. Thus, the color of the oxide phase in reflected electron image differs greatly depending upon the kind and amount of the alkaline earth metal added. It was found that there is an improvement in oxidation resistance when an oxide phase covers surfaces of silicon carbide particles and metallic silicon as shown in FIGS. 1 to 3. It was further found that the oxide phase is filled even in the fine pore portions (the portions where there is no necking by metallic silicon), complements the necking between silicon carbide particles, and gives an increased strength. Meanwhile, in FIG. 5 (Comparative Example 1), there can be confirmed, as in FIGS. 1 to 3, pores (black portions), silicon carbide particles (gray portions) and metallic silicon (light gray portions), but it was impossible to confirm any portion corresponding to an oxide portion. Incidentally, in FIG. 4 (Example 9), there are seen, as in FIGS. 1 and 2, pores (black portions), silicon carbide particles (gray portions), metallic silicon (light gray portions) and an oxide phase [dark gray (darker than silicon carbide particles) portions]; moreover, there can be confirmed those fly ash balloons which did not melt during firing and remained (circular portions) and such a phenomenon could not be confirmed in FIGS. 1 to 3. Thus, it was found that when the addition amount of the compound containing an alkaline earth metal is appropriate (FIGS. 1 to 3), the fly ash balloons added can be melted totally and there can be obtained a sufficiently large average pore diameter and a low pressure loss.

With respect to the pore former, when an organic pore former alone is used (Comparative Example 2), increases in both porosity and average pore diameter are made possible; however, it gives a reduced strength and further makes impossible the sufficient control of pore diameters distribution, resulting in a significant reduction in particles-trapping efficiency. Particularly when the porosity obtained is 80% or more and the average pore diameter obtained is 50 μm or more (Comparative Example 3), there is a significant reduction in strength and no required strength is obtained when the porous material obtained is used as a filter. In contrast, when the inorganic microballoons of the present invention and an organic pore former are used in combination (Example 6), it was found that the porosity and average pore diameter obtained are both increased greatly, yet the strength is improved and the distribution of pore diameters can be controlled sufficiently, therefore, the permeability is increased and yet a articles-trapping efficiency is assured.

INDUSTRIAL APPLICABILITY

As described above, the silicon carbide-based porous material of the present invention and the honeycomb structure constituted by the silicon carbide-based porous material comprises silicon carbide particles, metallic silicon and a desired oxide phase; therefore, they are high in porosity and strength and superior in oxidation resistance and thermal shock resistance and, when used as a filter, are very low in risks of having defects such as cuts (which cause leakage of fluid), large pores (formed by agglomeration of organic pore former) and the like and, therefore, are low in pressure loss and yet assures an efficiency of particles trapping.

The method for producing a silicon carbide-based porous material according to the present invention can produce, in given steps and under given conditions, a silicon carbide-based porous material which comprises silicon carbide particles, metallic silicon and a desired oxide phase and which is high in porosity and strength and superior in oxidation resistance and thermal shock resistance, without generating, in the porous material, any defect such as cut or the like.

The invention claimed is:

1. A method for producing a silicon carbide-based porous material, comprising:
    providing a mixed raw material containing silicon carbide particles and metallic silicon;
    adding inorganic microballoons containing Si and Al and a compound containing an alkaline earth metal to the mixed raw material to form a mixture;
    forming the mixture into a formed material having an intended shape; and
    calcining and firing the formed material to melt the inorganic microballoons and to obtain a porous material having a porous structure comprising silicon carbide aggregate articles bonded by metallic silicon articles constituting necking portions between the bonded silicon carbide aggregate particles, wherein an oxide phase containing Si, Al and an alkaline earth metal is present in and strengthening the necking portions, and is present at least on one of (i) surfaces of the silicon carbide particles and surfaces of the metallic silicon and (ii) at circumferences of the silicon carbide particles and circumferences of the metallic silicon;
    wherein the compound containing an alkaline earth metal is added, per 100 parts by mass of the inorganic microballoons added, by 10 to 25 parts by mass in terms of an amount of MgO when the alkaline earth metal contained in the compound containing an alkaline earth metal is Mg, by 14 to 35 parts by mass in terms of an amount of CaO when the alkaline earth metal is Ca, by 26 to 64 parts by mass in terms of an amount of SrO when the alkaline earth metal is Sr, or by 38 to 95 parts by mass in terms of an amount of BaO when the alkaline earth metal is Ba.

2. The method for producing a silicon carbide-based porous material according to claim 1, wherein the inorganic microballoons are added in an amount of 5 to 30 parts by mass per 100 parts by mass of a total of the silicon carbide particles and the metallic silicon.

3. The method for producing a silicon carbide-based porous material according to claim 1, wherein a total content of the Si source and Al source contained in the inorganic microballoons, relative to the inorganic microballoons residual portion which is an inorganic microballoons total portion minus the alkaline earth metal, expressed as a monoxide thereof, contained beforehand in a total portion, is 90% by mass or more when the Si source is expressed as $SiO_2$ and the Al source is expressed as $Al_2O_3$, and a content of the Al source contained in the inorganic microballoons, relative to the inorganic microballoons residual portion which is the inorganic microballoons total portion minus the alkaline earth metal, expressed as a monoxide thereof, contained beforehand in a total portion, is 20 to 55% by mass when the Al source is expressed as $Al_2O_3$.

4. The method for producing a silicon carbide-based porous material according to claim 1, wherein the intended shape of the formed material is a honeycomb shape.

5. The method for producing a silicon carbide-based porous material according to claim 1, wherein the formed material is fired at a temperature between 1410° C. and 1600° C. to melt the inorganic microballoons without evaporating the metallic silicon.

* * * * *

UNITED STATES PATENT AND TRADEMARK OFFICE
CERTIFICATE OF CORRECTION

| | | |
|---|---|---|
| PATENT NO. | : 8,173,054 B2 | |
| APPLICATION NO. | : 12/210434 | |
| DATED | : May 8, 2012 | |
| INVENTOR(S) | : Yuuichirou Tabuchi et al. | |

It is certified that error appears in the above-identified patent and that said Letters Patent is hereby corrected as shown below:

<u>Column 1</u>
  *Line 22*: please delete "A"

<u>Column 15</u>
  *Line 49*: please change both occurrences of "articles" to --particles--

Signed and Sealed this
Twenty-sixth Day of June, 2012

David J. Kappos
*Director of the United States Patent and Trademark Office*